Figure 1:
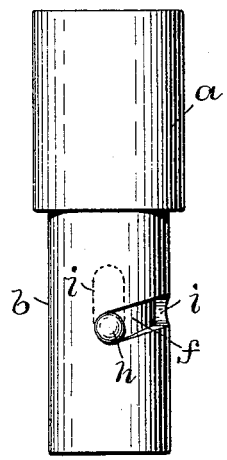

No. 611,781. Patented Oct. 4, 1898.
F. F. FIELD.
FAUCET VALVE.
(Application filed Dec. 15, 1897.)
(No Model.)

WITNESSES:
Chas. H. Luther Jr
B. M. Simmt

INVENTOR:
Frederick F. Field
by Joseph A. Miller & Co.
Attys.

THE NORRIS PETERS CO., PHOTO-LITHO., WASHINGTON, D. C.

UNITED STATES PATENT OFFICE.

FREDERICK F. FIELD, OF PROVIDENCE, RHODE ISLAND.

FAUCET-VALVE.

SPECIFICATION forming part of Letters Patent No. 611,781, dated October 4, 1898.

Application filed December 15, 1897. Serial No. 661,924. (No model.)

*To all whom it may concern:*

Be it known that I, FREDERICK F. FIELD, of Providence, in the county of Providence and State of Rhode Island, have invented a new and useful Improvement in Faucet-Valves; and I hereby declare that the following is a full, clear, and exact description of the same, reference being had to the accompanying drawings, forming part of this specification.

This invention has reference to an improvement in valves used to control the discharge of liquid from a tank or other supply.

The invention is particularly designed for use in vertical pipes leading from a tank or other supply to a discharging-faucet.

In valves for faucets the part operating the valve has to be connected with the valve-casing so as to prevent the leaking of the fluid through the connection. Cocks have to be ground so as to fit absolutely tight and valve-stems have to be provided with packed stuffing-boxes. Such valves are expensive and are liable to stick.

The object of my invention is to so construct a valve that the valve-operating part is not subjected to pressure and so that when the valve is opened the fluid discharged will flow through the tube or sleeve by which the valve is operated.

I have in the drawings shown the improvement as applied to a ball-valve and to a valve adjustably connected with the operating-sleeve.

Figure 2:
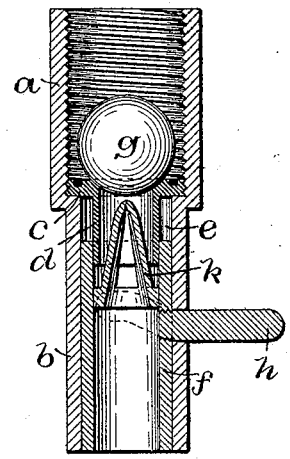
Figure 3:
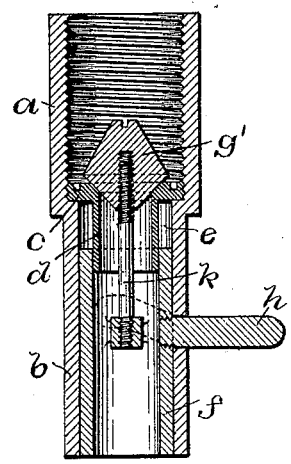

Figure 1 is a side view of a socketed pipe provided with the improved valve. Fig. 2 is a vertical sectional view of the socketed pipe provided with a ball-valve, and Fig. 3 is a vertical sectional view of the socketed pipe provided with a valve connected with the operating-sleeve.

In the drawings, $a$ indicates the socket at the upper end of the pipe $b$; $c$, the valve-seat secured in the lower part of the internally-screw-threaded socket $a$. The valve-seat is provided with the tubular extension $d$, placed concentric with the inside of the pipe $b$, so as to form the annular space $e$. The tubular sleeve $f$ fits the interior of the pipe $b$ with a loose sliding fit and the annular space $e$ with a close sliding fit. In Figs. 2 and 3 the sleeve $f$ is shown in the lowest position, the valve $g$ or $g'$ being seated to close the outlet. $h$ represents a handle secured to the sleeve $f$ and extending through a slot $i$. In the pipe $b$ this slot may be and preferably extends in a spirally-inclined direction, as is shown in solid lines in Fig. 1; but the slot may extend vertically, as indicated in broken lines. On sliding the sleeve $f$ upward the valve is lifted off from its seat and the fluid passes through the tubular extension $d$ and the tubular sleeve $f$ to be discharged from the lower end of the pipe $b$. The lifter $k$ may be a rod, as shown in Fig. 3, or a perforated cone, as shown in Fig. 2. When a ball-valve is used, the lifter $k$, connected to and sliding with the tubular sleeve $f$, is disconnected from the valve, and when a fixed valve is used the valve is connected by screw-thread engagement with the lifter, so that it can be adjusted to seat when the handle reaches the end of the slot $i$ or just before it reaches the end.

The valve is preferably made to be self-closing. As soon as the handle is released the valve will close.

Having thus described my invention, I claim as new and desire to secure by Letters Patent—

1. In a faucet-valve, the combination with a pipe, a valve-seat and a valve, of a tubular extension of the valve-seat, an annular space between the tubular extension and the pipe, a tubular sleeve sliding in the pipe and in the annular space, a lifter secured to the tubular sleeve, a slot in the pipe, and a handle secured to the tubular sleeve and extending through the slot in the pipe; whereby the valve is lifted off the seat, as described.

2. In a faucet-valve, the combination with the internally-screw-threaded socket $a$, the pipe $b$, the valve-seat $c$, and the valve, of the tubular extension $d$ of the valve-seat, the tubular sleeve $f$ sliding in the annular space formed by the pipe $b$ and the tubular extension $d$, a valve-lifter carried by the tubular sleeve, and means, substantially as described, for sliding the tubular sleeve; whereby the liquid is conducted into and through the tubular sleeve, as described.

In witness whereof I have hereunto set my hand.

FREDERICK F. FIELD.

Witnesses:
JOSEPH A. MILLER,
JOSEPH A. MILLER, Jr.